(12) United States Patent
Ramanna et al.

(10) Patent No.: US 7,480,297 B2
(45) Date of Patent: Jan. 20, 2009

(54) SYSTEM AND METHOD FOR CONTROLLING PACKET DATA BANDWIDTH

(75) Inventors: Shreesha Ramanna, Vernon Hills, IL (US); Jay P. Jayapalan, Buffalo Grove, IL (US); Dan Zhang, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 492 days.

(21) Appl. No.: 11/017,443

(22) Filed: Dec. 20, 2004

(65) Prior Publication Data

US 2006/0153119 A1 Jul. 13, 2006

(51) Int. Cl.
*H04L 12/54* (2006.01)
(52) U.S. Cl. .................... 370/392; 370/469
(58) Field of Classification Search .......... 370/389, 370/392, 465, 466, 468, 469, 230, 230.1, 370/231, 235
See application file for complete search history.

(56) References Cited

U.S. PATENT DOCUMENTS

| | | | |
|---|---|---|---|
| 5,987,022 A * | 11/1999 | Geiger et al. ............... 370/349 |
| 6,005,851 A * | 12/1999 | Craddock et al. ........... 370/329 |
| 6,205,149 B1 * | 3/2001 | Lemaire et al. ............. 370/401 |
| 6,535,511 B1 * | 3/2003 | Rao ............................ 370/392 |
| 6,640,248 B1 | 10/2003 | Jorgensen | |
| 6,721,555 B1 * | 4/2004 | Phillips et al. .............. 455/411 |
| 2004/0001437 A1 | 1/2004 | Duncan et al. | |
| 2005/0044206 A1 * | 2/2005 | Johansson et al. ........... 709/224 |

* cited by examiner

*Primary Examiner*—Wing F Chan
*Assistant Examiner*—Duc T Duong

(57) ABSTRACT

A system and method of managing the bandwidth of transmitted communications in a wireless network where a data packet (108) is received. The data packet (108) comprises a protocol identifier (110). At least one primary pattern identifier (110) is stored in a memory (103). The protocol identifier (110) is compared (204, 206) to the at least one primary pattern identifier and a data packet type is determined (210) based at least in part upon the comparing. A resource allocation scheme is selected from amongst a plurality of resource allocation schemes for application to a wireless network based at least in part upon the data packet type.

17 Claims, 4 Drawing Sheets

SYSTEM AND METHOD FOR CONTROLLING PACKET DATA BANDWIDTH

FIELD OF THE INVENTION

This invention generally relates to transmitting communications within networks. More specifically, it relates to transmitting communications quickly and efficiently within these networks.

BACKGROUND OF THE INVENTION

Known communication systems utilize various types of technologies to enable mobile stations to communicate with each other across a network. For example, Code Division Multiple Access (CDMA), Time Division Multiple Access (TDMA), and Frequency Division Multiple Access (FDMA) technologies have been used to allow mobile stations to communicate with each other. In addition, different architectures such as the third generation (3G) architecture have been employed within networks to facilitate these communications.

Regardless of the type of technology or architecture used, known systems are typically required to allocate system resources during network operation. For instance, a scheduler or scheduling algorithm is often used to schedule various tasks or processes executing within the network. In addition, resource allocation parameters such as the data bandwidth are selected in known systems to optimize network performance.

Unfortunately, problems occurred in known systems because of the nature of the resource allocation strategies used in these systems. For instance, since known systems do not consider the identity or nature of applications when making resource allocation decisions, the data storage capability provided in the network frequently becomes inadequate for many types of applications. Consequently, transmission delays occur within these systems leading to lost data packets.

Other problems are also associated with known approaches. For instance, known schedulers and scheduling algorithms do not consider the bandwidth of the applications, which frequently result in wasteful resource allocation whenever several applications are involved. Another problem associated with known approaches is that no dynamic determination of traffic shaping is provided. Still another problem associated with these systems is that resource allocation decisions are based on the amount of traffic flowing through a network rather than the type of traffic. This shortcoming frequently results in unfair allocation of system resources.

Figure 1:
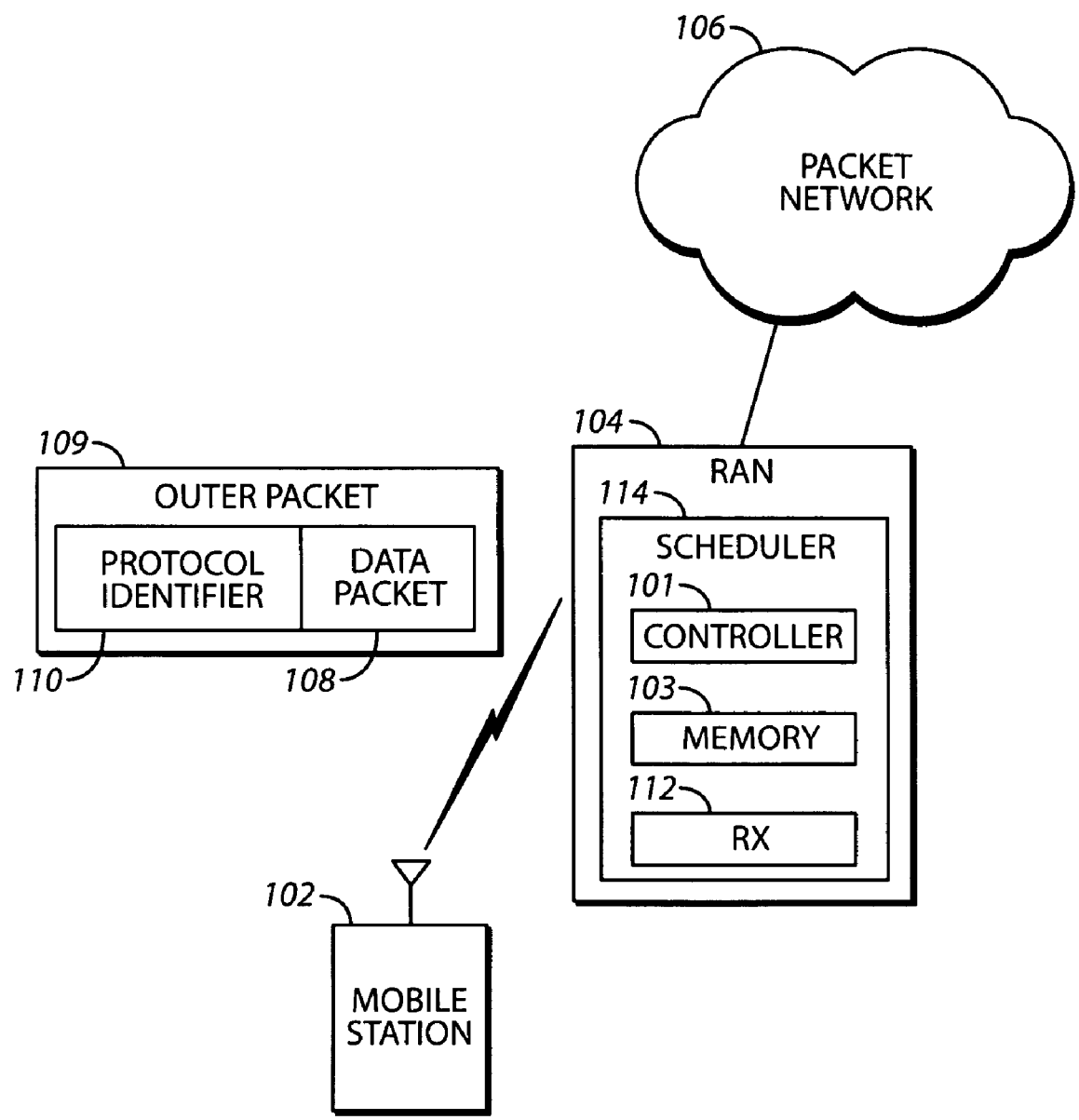
FIG. 1 is a block diagram showing a system for the efficient allocation of resources in a network according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method for allocating resources in a network customizes the selection of the resource allocation scheme and other resource-related parameters. The selection is based upon the characteristics of a user and/or the particular applications involved. Enhanced traffic shaping capabilities, adequate data storage for all types of applications, and resource allocation fairness are provided by using this approach.

In many of these embodiments, the bandwidth of transmitted communications in a wireless network is managed and adjusted to fit the specific type of user and/or application. A data packet is received somewhere within the infrastructure of the network. The data packet comprises a protocol identifier. At least one primary pattern identifier is stored in a memory located within the infrastructure. The protocol identifier is compared to the primary pattern identifier stored in the memory and a data packet type is determined based upon the results of the comparison.

When the protocol identifier matches the primary pattern identifier, selection of a resource allocation scheme is made. The resource allocation scheme may then be applied to the network. On the other hand, where more than one match is indicated after the primary match attempt, the protocol identifier may be next compared to a secondary pattern identifier. A successful secondary match may narrow the primary match to a specific protocol or more specific group of protocols. However, if the secondary match attempt is not conclusive, other levels of matching may be attempted until a specific protocol is indicated.

In many of these embodiments, determining the resource allocation scheme may include determining both a particular scheduling algorithm and a specific data rate to be used with the scheduling algorithm. The number of resources to be used in the system may also be adjusted. Other resource allocation parameters may also be adjusted.

Thus, the resource allocation scheme and other parameters are determined within a network on a per-user and/or per-application basis. Data capacity shortfalls within the network are avoided. The particular type of application is considered in resource allocation decisions, which enhances the flow of information through the network. Dynamic traffic shaping is provided thereby improving information flow within the network. Since the allocation of resources can be based upon data packet type, the fairness of the resource allocation scheme is also improved.

Referring now to FIG. 1, one example of a system for efficient resource allocation is described. A mobile station 102 transmits data packets to a Radio Access Network (RAN) 104, which is coupled to and communicates with a packet network 106.

The mobile station 102 may be any type of mobile wireless device such as a cellular telephone, pager, or personal digital assistant (PDA). The RAN 104 provides transmission, radio control, and management functions allowing the mobile station 102 to access the packet network 106. For example, the RAN 104 may include various subsystems, such as Base Controller Stations (BSCs), Base Transceiver Stations (BTSs), gateways, and switches (all not shown for simplicity) that allow a connection to be formed between the mobile station 102 and the packet network 106.

The RAN 104 also includes a scheduler device 114, which includes a controller 101 for performing the processing actions described in this application. In addition, the scheduler device 114 includes a memory 103 for storing pattern identifiers that are compared against a protocol identifier to determine a data packet type. The controller 101 and memory 103 may comprise a scheduler device. Various subsystems, such as the BSCs and the BTSs within the RAN 104 may house the scheduler device 114.

The packet network 106 may be a network or combination of networks that allow the mobile station 102 to communicate with other subscribers or services. For instance, the packet network 106 may include one or more networks such as the Internet, private intranets, the Public Switched Telephone Network (PSTN), and other RANs, to name a few. In addition, those skilled in the art will understand that the packet network 106 includes the various functional components such as gateways, servers, and switches that allow information to be exchanged.

In one example of the operation of the system of FIG. 1, a data packet 108 (i.e., the payload) is transmitted from the mobile station 102 and received by a receiver 112 in the scheduler device 114. The data packet 108 comprises a protocol identifier 110. The protocol identifier 110 identifies the type of data packet being transmitted. For example, the data packet type may be a Link Control Protocol (LCP) Configuration Request data packet type, a Challenge Handshake Authentication Protocol (CHAP) authorization data packet type, an IP Control Protocol (IPCP) Request data packet type, an Internet Protocol/User Datagram Protocol (IP/TCP) data packet type, or an Internet Protocol/Transmission Control Protocol (IP/TCP) data packet type. Other examples of protocol identifiers and types are possible. Further, the data packet 108 may be encapsulated by an outer packet 109. The data packet 108 may be sent between some entities (e.g., the packet data network 106 and the mobile station 102) while the outer packet 109 (including the contents) can be sent between others (e.g., the packet data network 106 and the RAN 104). In this regard, known techniques can be used to identify and extract the payload portion (i.e., the data packet 108 with identifier 110) from the outer packet 109 so that either the outer packet 109 or payload portions may be forwarded.

In this example, a primary pattern identifier is stored in the memory 103 of the scheduler device 114. The protocol identifier 110 is compared to the primary pattern identifier stored in memory and a data packet type is determined based upon the results of the comparison.

In addition, if the comparison between the protocol identifier 110 and the primary pattern identifier is inconclusive (e.g., more than one possible match is determined), another level of matching may be attempted using a secondary pattern identifier. This matching may continue using other patterns until a specific identification is achieved. In other words, any number of patterns matches may be used. Alternatively, the matching may be halted after any level of comparison if it is determined that the pending result is adequate for resource allocation scheme or parameter selections.

A resource allocation scheme and other resource-related parameters may be selected from a plurality of resource allocation schemes for application to the RAN 104 and/or the packet network 106 based upon the determined data packet type. After the selection is complete, the resource allocation scheme and any other resource-related parameters may be applied to the networks 104 and/or 106. The resources allocated may include controllable RF parameters and physical resources (such as memory resources, CPU resources, and backhaul bandwidth in a RAN). Other examples of resources are possible.

Different system components (e.g., the BSC, BTS or scheduler 114) may monitor payload changes of the data packet 108. Based upon the payload changes detected, the scheduler and resources may also be adjusted accordingly. Furthermore, the approaches described herein can be applied to multiple applications of multiple users and multiple sessions of these users. For instance, when multiple users, sessions, or applications exist, the approaches described herein can adjust resources, fairness and priority amongst these users, sessions, and applications. The approaches described herein can also be applied to multiple applications of a single user.

Figure 2:
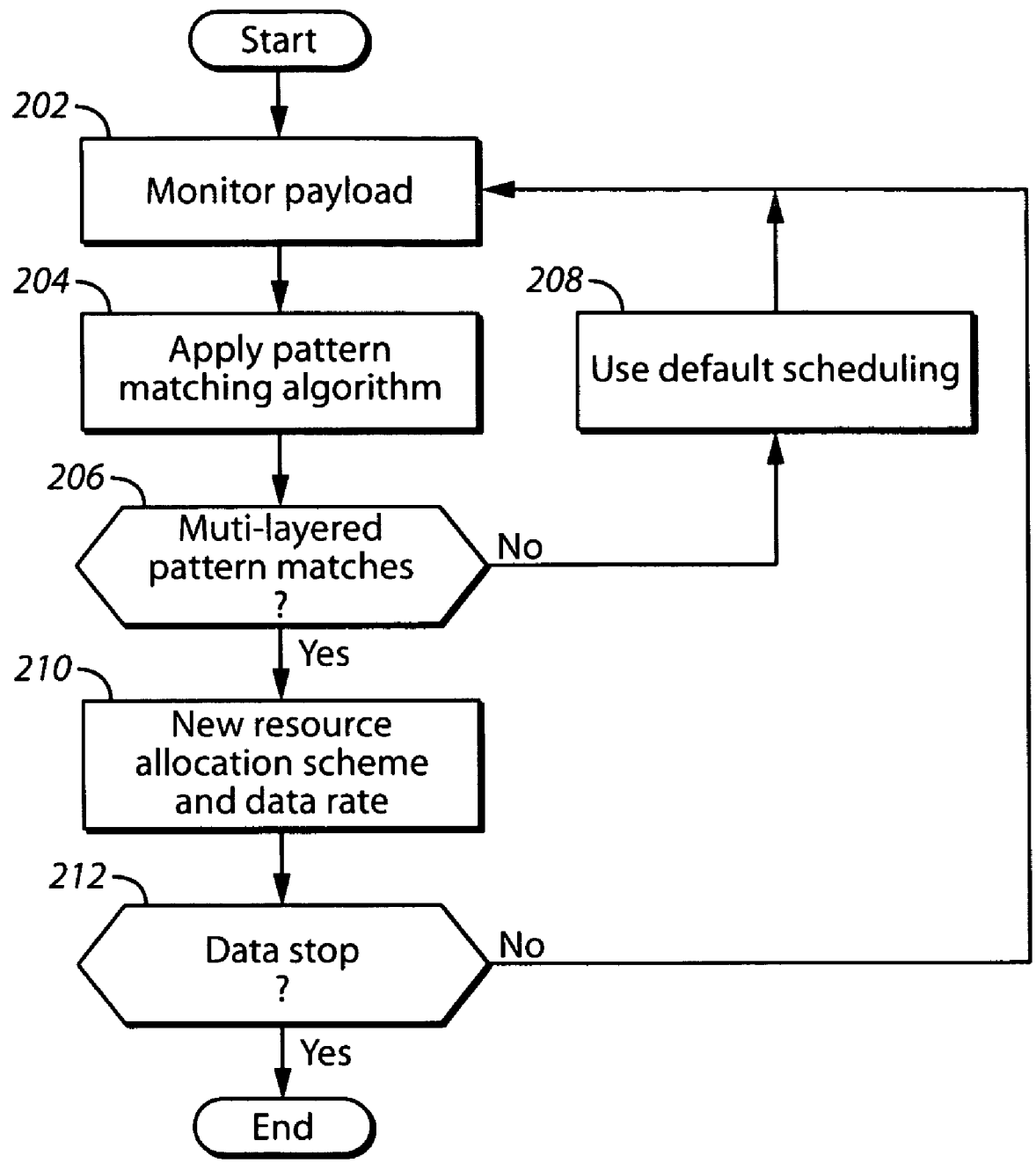
FIG. 2 is a flow chart showing an approach for the efficient allocation of resources in a network according to various embodiments of the present invention.

Referring now to FIG. 2, an example of an approach for efficient resource allocation is described. At step 202, a payload of a data packet is monitored by the system. The monitoring may occur at any point within the system. In one preferred example, the monitoring occurs at a BSC or BTS within a RAN. Monitoring of the payload may identify the payload header. The payload header may include a protocol identifier that identifies the type of packet or protocol used to transmit the packet.

At step 204, the system applies a primary matching algorithm to the identifier recovered from the payload header. For example, the system may attempt to match the identifier with a primary pattern identifier, for instance, a series of binary values. This attempt at matching may uniquely identify the type of the packet. Alternatively, this step may result in the identification of a group of candidate types with further processing required to narrow the candidate types to a single type. In this case, the system may attempt to match the identifier with a secondary pattern identifier. Additional levels of pattern matching may also be undertaken if the secondary match yields inconclusive results.

At step 206, it is determined whether there have been any pattern matches. If the answer is negative, then control continues at step 208 where a default scheduling algorithm is used. If the answer is affirmative, then control continues at step 210. One example of multi-layer pattern matching is described elsewhere in this application with respect to FIG. 4.

At step 210, a new resource allocation scheme and other resource-related parameters can be selected. In one example, a scheduling algorithm and data rate are selected. At step 212, it is determined whether a data stop (end of data) has been detected. If the answer is affirmative, then execution ends. If the answer is negative, then execution continues with step 202 as described above.

Figure 3:
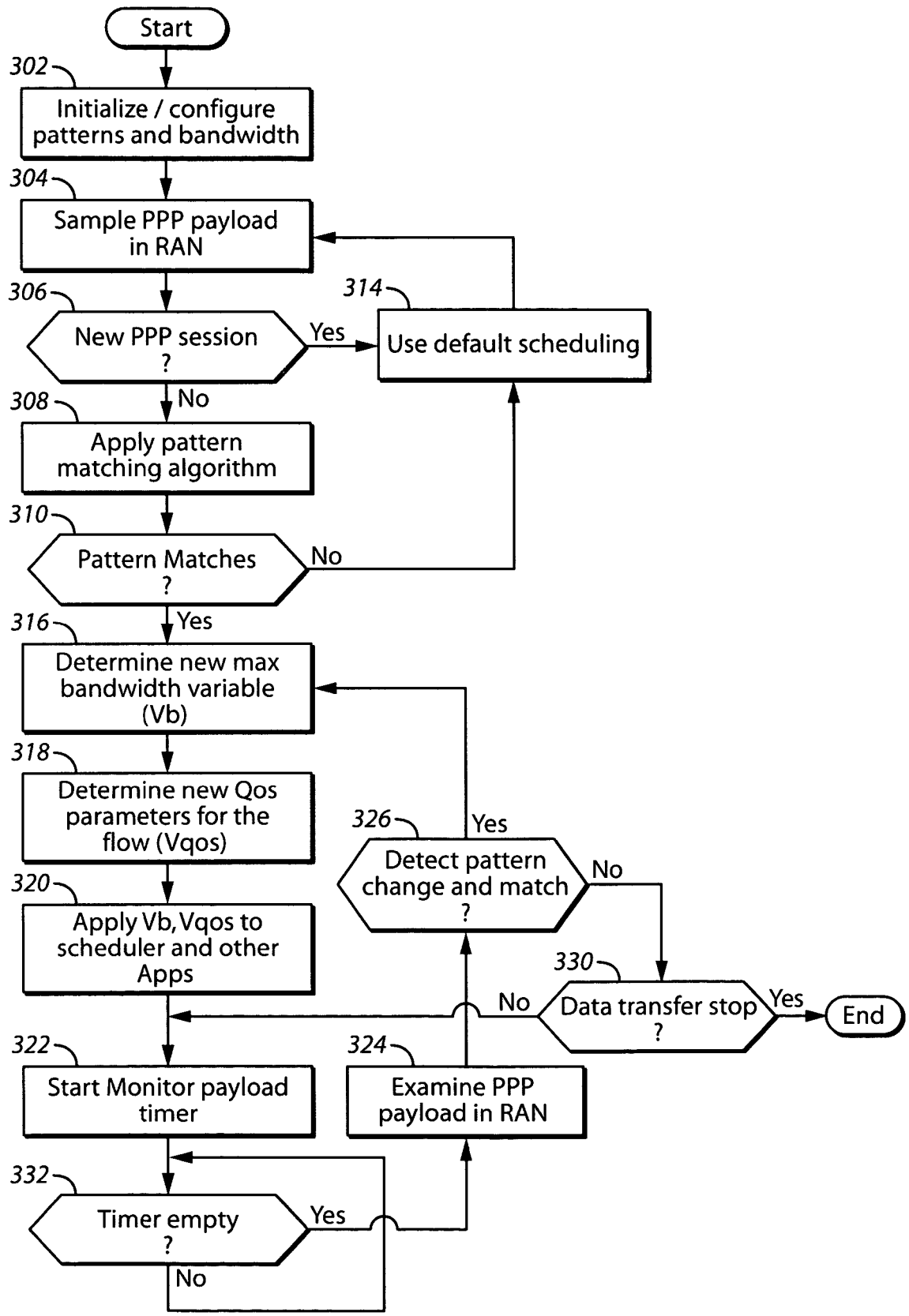
FIG. 3 is a flowchart showing another example of an approach for the efficient allocation of resources in a network according to various embodiments of the present invention.

Referring now to FIG. 3, another example of an approach for the efficient allocation of resources within a network is described. This approach may be implemented in a scheduler device. At step 302, the patterns to be stored in memory and a bandwidth are initialized and programmed into memory. For example, an operator may program a primary pattern identifier and secondary pattern identifier into a memory of a RAN. In addition, other resource-related parameters such as the bandwidth may also be programmed by the operator.

At step 304, a payload of a packet conforming to the Point-to-Point Protocol (PPP) and having a protocol identifier field is sampled by the RAN. At step 306, it is determined whether a new PPP session has been detected. If the answer at step 306 is affirmative, then execution continues at step 314 where a default scheduling algorithm is used since bearer traffic (payload) is not carried in the initial PPP packet. Control then continues at step 304 as described above. If the answer at step 306 is negative, then at step 308 a primary pattern matching algorithm is applied to the identifier. In this case, a comparison is made between a primary pattern identifier stored in memory and the protocol identifier field that was detected in the payload. In addition, a secondary match attempt may be made if the primary match attempt is inconclusive. Other levels of matching may also be used until the data packet type is conclusively determined.

Alternatively, the matching attempts may be halted when it is determined that the identification of a data packet type is adequate to select a resource allocation scheme and/or resource-related parameters. For example, if after primary and secondary attempts are completed two candidate types remain, the system may use these two candidate types to select a resource allocation scheme and other resource-related parameters. At step 310, it is determined if a pattern match has been detected. Execution then continues with step 314 as described above.

At step 316, a new maximum bandwidth variable is determined. At step 318, new Quality-of-Service (QoS) parameters are determined. At step 320, the new maximum bandwidth and the new QoS parameters are applied to the scheduler and other applications. With bandwidth and QoS parameters obtained from steps 316 and 318, the RAN is able to allocate and reallocate system resources and adjust priority to this particular session. In doing so, the RAN may impact resource allocation to the applications.

At step 322, the payload timer is monitored. It is not practical to monitor each packet. To conserve system processing power, the timer allows the user to monitor the payload periodically. The timer also allows the algorithm to determine payload changes and take needed actions periodically. The timer value setting is preferably configurable and based upon either payload type or system implementation.

At step 332, it is determined whether the payload timer has expired. If the answer at step 332 is negative, execution continues at step 332. If the answer at step 332 is affirmative, execution continues at step 324. At step 324, the payload is examined and it is determined whether the pattern has changed and whether a pattern match exists (step 326). If the answer is affirmative, control continues at step 316 as described above. If the answer is negative, control continues at step 330. At step 330, it is determined if the data transfer has stopped. If the answer is negative, control continues with step 322. If the answer is affirmative, execution ends.

Figure 4:
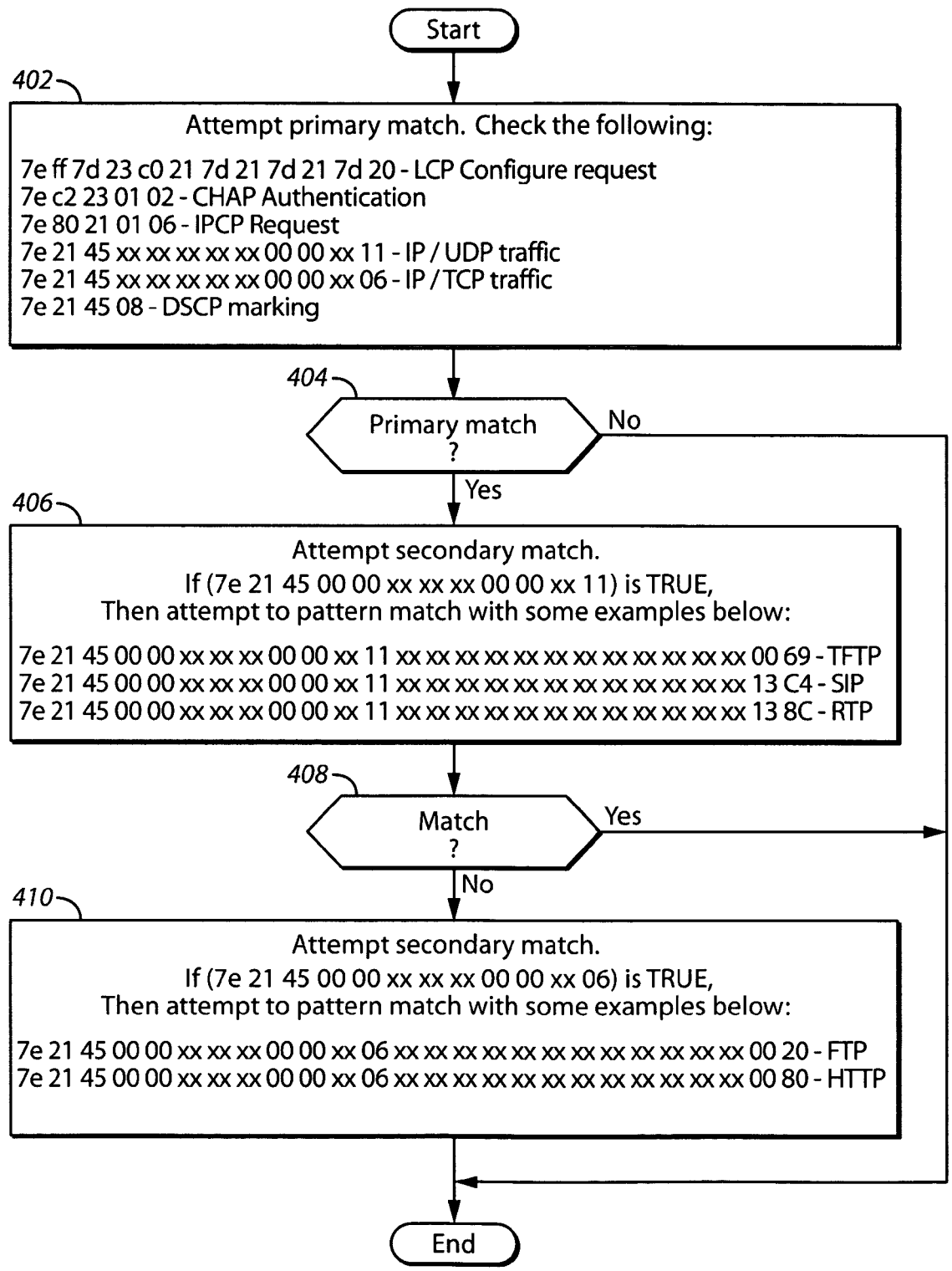
FIG. 4 is a flowchart of one example of a multi-layer pattern matching approach according to various embodiments of the present invention.

Referring now to FIG. 4, one example of a multi-layer pattern matching algorithm is described. At step 402, a primary pattern match is attempted. In this example, the system attempts to determine if the identifier matches the Link Control Protocol (LCP) Configuration Request data packet type, the Challenge Handshake Authentication Protocol (CHAP) authorization data packet type, the IP control Protocol (IPCP) Request data packet type, the Internet Protocol/User Datagram Protocol (IP/UDP) data packet type, the Internet Protocol/Transmission Control Protocol (IP/TCP) data packet type, or the DSCP marking data packet type.

In the case of a LCP Configuration Request data packet type, the identifier is checked for a "7e ff 7d 23 c0 21 7d 21 7d 21 7d 20" bit pattern (As used herein, patterns are described as hexadecimal values where "x" denotes any hexadecimal value). In the case of the CHAP authorization data packet type, the identifier is checked for a "7e c2 23 01 02" pattern. In the case of the IPCP Request data packet type, the identifier is checked for a "7e 80 21 01 06" pattern. In the case of the IP/UDP data packet type, the identifier is checked for a "7e 21 45 xx xx xx xx xx 00 00 xx 11" pattern. In the case of the IP/TCP data packet type, the identifier is checked for a "7e 21 45 xx xx xx xx xx 00 00 xx 06" pattern. In the case of the DSCP marking data packet type, the identifier is checked for the "7e 21 45 08" pattern.

At step 404, it is determined whether a primary match has been detected. If the answer is negative, execution ends. If the answer is affirmative, at step 406 a secondary match is attempted. In this example, if the primary data packet type is identified as the IP/UDP data packet type, it is determined whether the data packet is of the Trivial File Transfer Protocol (TFTP), Session Initiation Protocol (SIP), or Real-time Transport Protocol (RTP) type. The secondary match may be accomplished by matching a secondary bit pattern against the identifier.

For instance, the identifier is checked to see if it matches the "7e 21 45 00 00 xx xx xx 00 00 xx 11 xx xx xx xx xx xx xx xx xx xx xx xx 00 69" pattern corresponding to TFTP data packet type. The identifier is also checked to see if it matches the "7e 21 45 00 00 xx xx xx 00 00 xx 11 xx xx xx xx xx xx xx xx xx xx xx xx 13 c4" pattern corresponding to the SIP data packet type. The identifier is further checked to see if it matches the "7e 21 45 00 00 xx xx xx 00 00 xx 11 xx xx xx xx xx xx xx xx xx xx xx xx 13 8c" pattern corresponding to the RTP data packet type.

At step 408, it is determined if a secondary match has been made. If the answer is affirmative, then execution ends. If the answer is negative, then at step 410 another attempt is made to find a secondary match if the primary match was an Internet Protocol/Transmission Control Protocol (IP/TCP) data packet type. In this case, the data packet may be a File Transfer Protocol (FTP) or HyperText Transfer Protocol (HTTP) type. The matching may be attempted by matching a bit pattern against the identifier.

For instance, the identifier is checked to see if it matches the "7e 21 45 00 00 xx xx xx 00 00 xx 06 xx xx xx xx xx xx xx xx xx xx xx xx 00 20" pattern corresponding to the FTP data packet type. The identifier is also checked to see if it matches the "7e 21 45 00 00 xx xx xx 00 00 xx 06 xx xx xx xx xx xx xx xx xx xx xx xx 00 80" pattern corresponding to the HTTP data packet type. If any of these patterns are found, execution ends.

Based upon the primary and secondary patterns of the payload, the scheduler operates within certain thresholds. If the scheduler can not meet the demands of these thresholds, it may resort to default or alternative thresholds. For example, for HTTP applications, the allowed data rate may be set to 50 Kbps to 2 Mbps, the data loss tolerance to medium, the delay to less than one second, the jitter to 0.5 seconds, the queue length to 0-10 KBytes, and the bandwidth to 75% of maximum throughput. For FTP applications, the allowed data rate may be set to the lesser of 2 Mbps or 40% of the bandwidth, the data loss tolerance to 5%, the delay to less than one second, the jitter to 0.5 seconds, the queue length to 0 to 10 KBytes, and the bandwidth to 75% if not shared or an exponential decrease if not shared with other traffic. For FTTP applications, the allowed data rate may be set to 10% of the available bandwidth, the data loss tolerance to 1/100000 packets, the delay to less than one second, the jitter to 0.5 seconds, the queue length to 0-10 KBytes, and the bandwidth to a maximum of 10%. For SIP applications, the allowed data rate may be set to less than 50 Kbps, the data loss tolerance to a minimum value, the delay to less than 0.5 seconds, the jitter to 0.01 seconds, the queue length to 3 K Bytes.

Thus, resource allocation scheme and/or parameter selection within a network are customized on a per-user and/or per-application basis. Data capacity shortfalls within the network are prevented. The particular type of application is considered in resource allocation decisions, which enhances the flow of information through the network. Dynamic traffic shaping is provided and the fairness of the resource allocation scheme selection and resource parameter allocation are also improved.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of managing bandwidth of transmitted communications in a wireless network comprising:
   receiving a data packet, the data packet comprising a protocol identifier;
   comparing the protocol identifier to at least one primary pattern identifier and to at least one secondary pattern when the profile identifier matches the at least one primary pattern identifier;
   determining a data packet type based at least in part upon the comparing; and
   selecting a resource allocation scheme from amongst a plurality of resource allocation schemes for application to a wireless network based at least in part upon the data packet type and wherein selecting a resource allocation scheme includes determining a scheduler algorithm and a data rate.

2. The method of claim 1 further comprising applying the resource allocation scheme to the network.

3. The method of claim 2 wherein applying the resource allocation scheme further comprises using the resource allocation scheme to adjust resources selected from a group comprising controllable RF parameters and physical resources.

4. The method of claim 3 wherein using the resource allocation scheme comprises adjusting physical resources selected from a group comprising a memory, a CPU, and backhaul bandwidth in a RAN.

5. The method of claim 1 further comprising applying a default resource allocation scheme when the comparing determines no matches.

6. The method of claim 1 further comprising periodically monitoring changes in a pattern of a payload and adjusting the scheduler and resources based upon the changes.

7. The method of claim 1 wherein the selecting the resource allocation scheme comprises determining a scheduler algorithm, a data rate, and a number of resources.

8. A scheduling device for facilitating efficient communications in a wireless network comprising:
   a receiver having an input that receives a data packet, the data packet comprising a protocol identifier;
   a memory having at least one primary pattern identifier and at least one secondary pattern stored therein;
   a controller coupled to the input of the receiver and the memory, the controller programmed to compare the protocol identifier with the at least one primary pattern stored in the memory, the controller further programmed to determine a data packet type based at least in part upon whether the protocol identifier sufficiently matches the at least one stored primary pattern identifier and the at least one secondary pattern and, responsively, selecting a resource allocation scheme wherein the resource allocation scheme comprises a scheduling algorithm, number of resources, and data rate.

9. The device of claim 8 wherein the controller further comprises an output and wherein the resource allocation scheme is transmitted via the output.

10. The device of claim 8 wherein the controller further comprises means for selecting a default resource allocation scheme when no match is detected between the identifier and the at least one stored primary pattern identifier.

11. The device of claim 8 wherein the controller is further programmed to attempt to match at least one secondary pattern stored in the memory to the protocol identifier.

12. The device of claim 8 wherein the at least one primary pattern identifier is programmed into the memory by an operator.

13. The device of claim 8 wherein a payload of the data packet comprises a Point-to-Point Protocol (PPP) header.

14. The device of claim 8 wherein the data packet type is selected from a group comprising a Link Control Protocol (LCP) configuration request, an Internet Protocol (IP) traffic data packet, a Session Initiation Protocol (SIP) request, and a HyperText Transfer Protocol (HTTP) request.

15. The device of claim 8 wherein the controller is programmed to identify primary and secondary patterns in the data packets.

16. The device of claim 15 wherein the device operates within configurable thresholds and wherein the thresholds are adjusted to alternative settings when a demand of the thresholds is not met.

17. The device of claim 8 wherein controller is further programmed to independently adjust resource allocation, fairness, and priority for multiple users, applications, and sessions.

* * * * *